United States Patent [19] [11] Patent Number: 4,880,307
Endo et al. [45] Date of Patent: Nov. 14, 1989

[54] METHOD OF DETECTING THE POSITION OF AN OBJECT

[75] Inventors: Motonori Endo; Hiroshi Minakami, both of Yokohama, Japan

[73] Assignee: Nissan Motor Co., Ltd., Yokohama, Japan

[21] Appl. No.: 215,098

[22] Filed: Jul. 5, 1988

[30] Foreign Application Priority Data

Jul. 6, 1987 [JP] Japan ................................ 62-167065

[51] Int. Cl.$^4$ ............................................. G01B 11/14
[52] U.S. Cl. .................................................... 356/375
[58] Field of Search ................................. 356/376, 375

[56] References Cited

U.S. PATENT DOCUMENTS 4,299,491 11/1981 Waters et al. ...................... 356/376

Primary Examiner—Léon Scott, Jr.
Attorney, Agent, or Firm—Pennie & Edmonds

[57] ABSTRACT

In a position detection system when a preselected parameter magnitude of a signal produced in response to a received reflected laser beam, is excessively high, the power of the laser is reduced until such a satisfactory level is reached. On the other hand when the signal level is low and laser power cannot be increased further, signal amplification is induced until such time as the required level is produced.

5 Claims, 3 Drawing Sheets

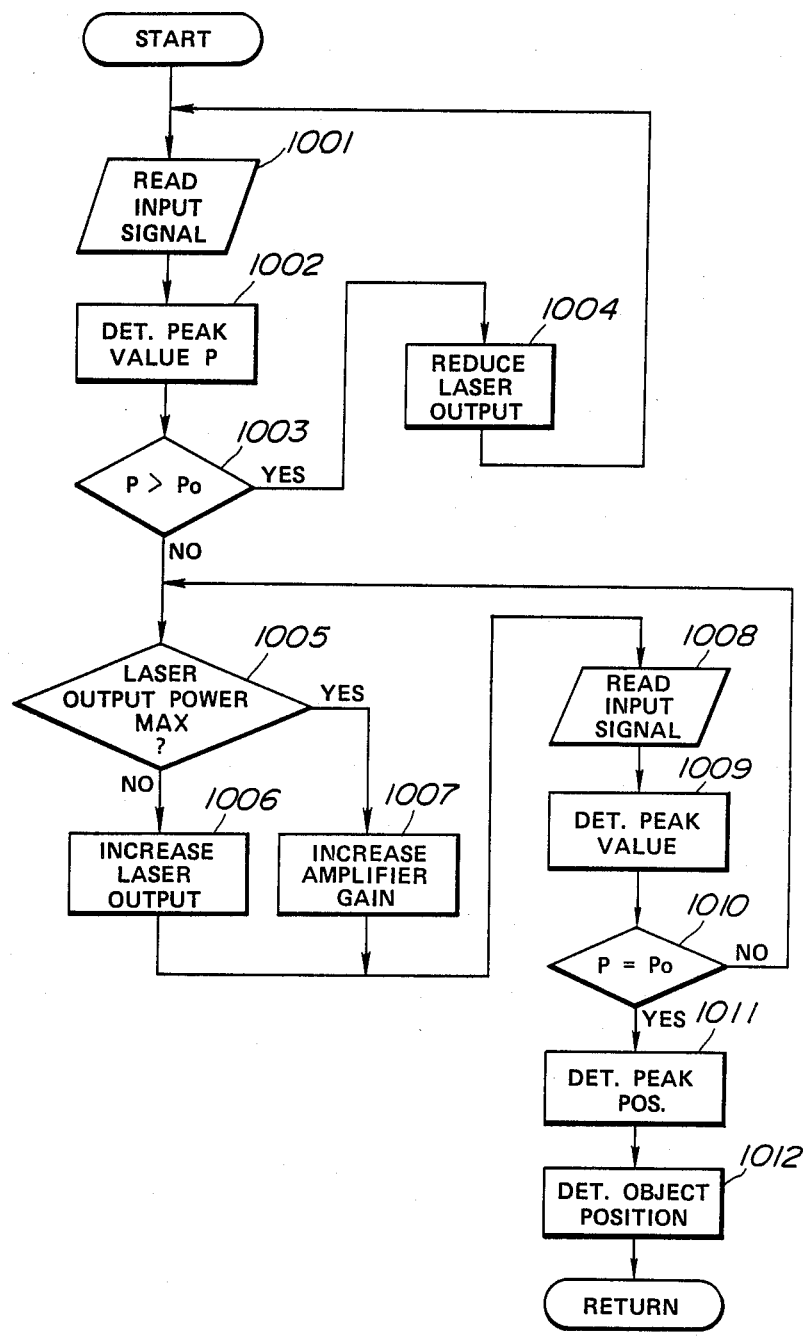

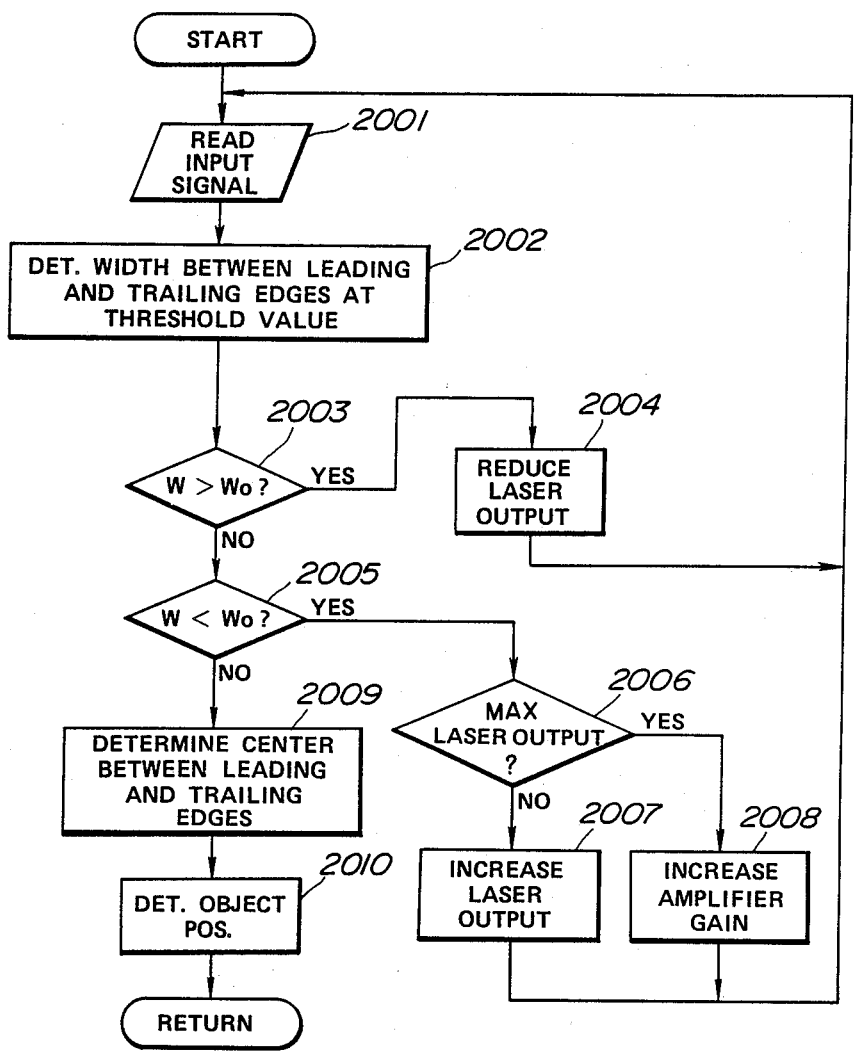

METHOD OF DETECTING THE POSITION OF AN OBJECT

BACKGROUND OF THE INVENTION

1. Field of the Invention

The present invention relates to a method of position detection and more specifically to a method of sensing the position of a object using a "no (physical) contact" type light beam reflection technique.

2. Description of the Prior Art

A previously proposed technique generates a laser beam using a semiconductor type laser source and induces this beam to reflect off an object toward a camera which includes a one dimensional type sensor or pickup. The image formed on the photo sensitive arrangement of the sensor is used to induce each of the photo sensitive elements to react in accordance with the intensity of the light which impinges thereon and produce electric signals which vary accordingly.

The position of the peaks of each of the signals generated is supplied to a floating digitizer and used to develop a reflected image which is used to determined the distance of the object.

However, these arrangements have suffered from the drawback that the output of the laser source sometimes tends to become excessively strong and/or is totally reflected back into the pickup. This induces the signals produced to be excessively strong and to saturate the system in a manner which crops off the top of a wave signal formed using the image signals and prevents the position of a peak value thereof from being located. As a result the position of the object cannot be accurately detected. Even if the amplification degree is lowered under these conditions the saturation phenomenon is not overcome and the erroneous nature of the detection persists.

On the other hand, it sometimes happens that the level of the laser output falls excessively low level or the object is excessively far away. Under these conditions, the weakness of the received signals induces the situation wherein position of the central peak cannot be determined among those produced by the noise even if the level of signal amplification is increased the noise components of the signal are also increased and still the central peak cannot be discerned. Accordingly, under these conditions also accurate determination of the distance of the object (viz., position thereof) cannot be accomplished.

SUMMARY OF THE INVENTION

It is an object of the present invention to provide a technique via which a position sensing arrangement which uses laser beams and the like can be operated in a manner wherein the above mentioned saturation and/or excessive noise problems are obviated and accurate position sensing is assured In brief, the above object is achieved by an arrangement wherein, when a preselected parameter magnitude of a wave form signal produced in response to a received reflected laser beam, is excessively high, the power of the laser is reduced until such time a satisfactory level is reached. On the other hand, when the signal is low and the laser power cannot be increased further, signal amplification is induced until such time as the required level is produced.

More specifically, a first aspect of the present invention comprises a method of detecting the position of a movable object, the method featuring the steps of producing a laser beam; reflecting the laser beam off the object to produce a reflected beam; monitoring the reflected beam using a photo responsive sensor; converting the received reflected beam into a signal indicative of the image produced in the sensor, said signal having a wave form; detecting the magnitude of a selected parameter of the wave form; comparing the magnitude with the maximum permissible value; reducing the power of the laser beam in the event that the magnitude is greater than the maximum permissible value; determining, in the event that the magnitude is lower than the maximum permissible limit, if the laser beam power is maximized; increasing the power of the laser beam in the event that the power thereof is not maximized; and increasing the degree of amplification of the signal in the event that the power of the laser is maximized.

A second aspect of the present invention is deemed to comprise a method of detecting the position of a movable object which features the steps of: producing a laser beam; reflecting the laser beam off the object to produce a reflected beam; monitoring the reflected beam using a photo responsive sensor; converting the received reflected beam into a signal indicative of the image produced in the sensor, said signal having a wave form; reading said signal and detecting the height of the wave form peak; comparing the peak height with the maximum permissible value; reducing the power of the laser beam in the event that the height is greater than the maximum permissible value until such time as height becomes equal to the maximum permissible level; determining, in the event that the magnitude is lower than the maximum permissible limit, if the laser beam power is maximized; increasing the power of the laser beam in the event that the power thereof is not maximized; increasing the degree of amplification of the signal in the event that the power of the laser is maximized; detecting the height of the wave form for a second time; comparing the height with the maximum permissible value; repeating the steps of: determining if the power of the laser beam is maximized or not; increasing the power of the laser in the event that the laser is not being operated at full power; and increasing the degree of amplification of the signal in the event that the laser is being operated at full power; until such time as the height becomes equal to the maximum permissible level; and using the signal having this height to determine the position of the object.

A third aspect of the invention comprises a method of detecting the position of a movable object which features the steps of: producing a laser beam; reflecting the laser beam off the object to produce a reflected beam; monitoring the reflected beam using a photo responsive sensor; converting the received reflected beam into a signal indicative of the image produced in the sensor, said signal having a wave form; measuring the width of the wave form at a predetermined threshold value; performing a first comparison of the measured width with a maximum permissible value; reducing the power of the laser beam in the event that the measured width is greater than the maximum permissible value until such time as the magnitude becomes equal to the maximum permissible value; performing a second comparison in the event that the first comparison reveals the measured width is less than the maximum permissible valve, the second comparison again comparing the measured width with the maximum permissible value; determining, in the event that the measured width is less than the maximum permissible value, if the laser beam power is maximized; increasing the power of the laser beam in the event that the power thereof is not maximized; increasing the degree of amplification of the signal in the event that the power of the laser is maximized until the measured width becomes equal to the predetermined value; determining the mid point of the measured width; and using the mid point to determined the distance of the object.

BRIEF DESCRIPTION OF THE DRAWINGS

FIGS. 2 and 3 are flow charts which depict the characterizing steps performed in accordance with first and second embodiments of the present invention.

DETAILED DESCRIPTION OF THE PREFERRED EMBODIMENTS

Figure 1:
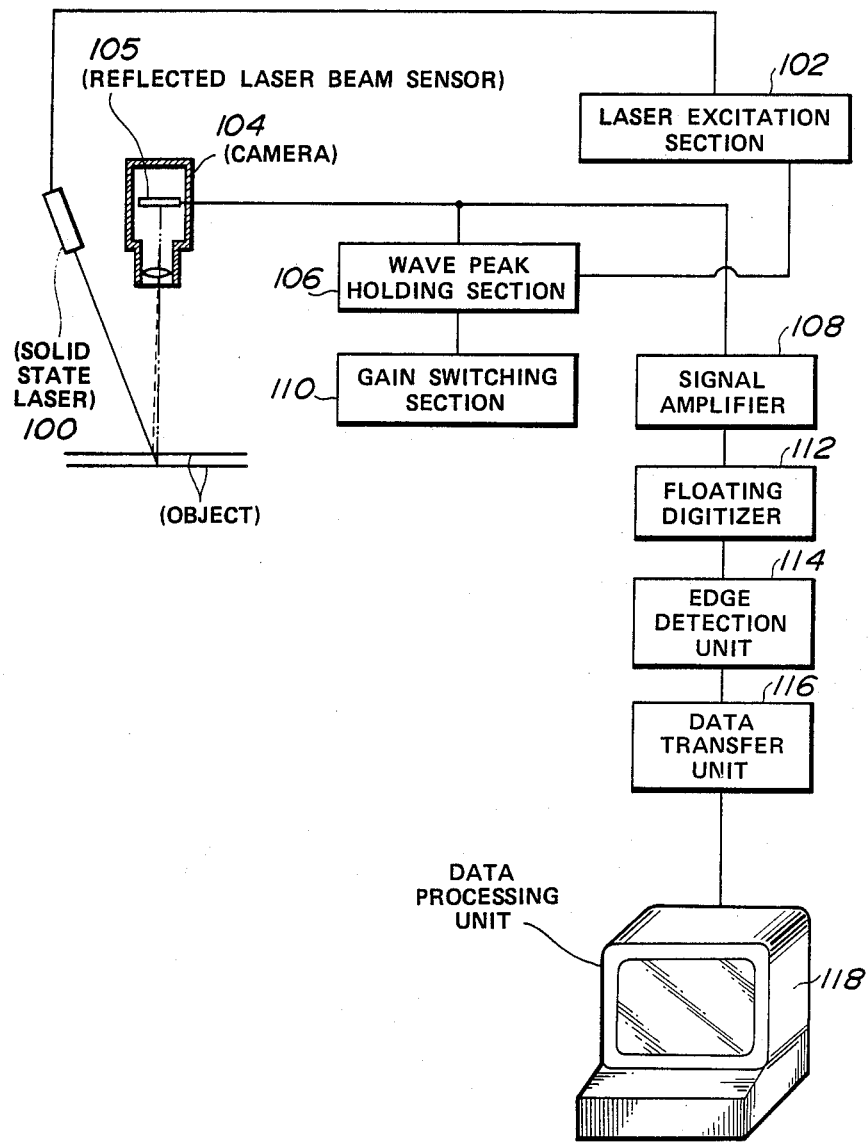
FIG. 1 shows in schematic form a system which incorporates the present invention.

FIG. 1 shows a system in which the embodiments of the present invention are incorporated. This arrangement includes a semiconductor type laser source 100 which is operatively connected with a exciting circuit 102. This circuit 102 pumps the laser and induces the same to produce a beam of coherent light A which propergates toward an object the distance of which is to be sensed.

As shown in this figure, the laser beam A impinges at point B and a reflected beam C is reflected toward and received by a camera arrangement 104. This camera 4 includes a single dimensional CCD type photo sensitive arrangement 105 on which an image D is formed. The location where this image forms is indicative of the distance of the object from the laser source. Viz., as shown in FIG. 1, as the distance between the object and the camera decreases the manner in the laser beam is reflected changes from that shown in solid line to that shown in broken line.

Accordingly, by detecting the position of the image it is possible to determined the position of the object (viz., the distance from the laser source).

The illustrated arrangement further includes a wave form peak holding circuit 106, a signal amplification circuit 108, a gain switching circuit 110 and a floating digitizer circuit 112. As these elements are well known in the art to which the instant invention pertains no further disclosure is deemed necessary The CCD element used in the instant arrangement is, as also well known, such that the individual photo responsive elements thereof are such as to produce voltages the levels of which vary with the amount and the length of time for which light impinges thereon and thus indicate the strength of the portion of the reflected beam which impinges thereon. The outputs of each of the photo responsive elements are suitably converted into output signals which are sequentially fed to both the wave peak holding circuit 106 and the amplifier section 108. The wave peak holding circuit determines the size of the peak and outputs a control signal to the gain switching section 110.

The signal amplifying section 108 amplifies the incoming image signal in accordance with the output of the gain switching circuit and relays the result to the floating digitizer 112. The latter mentioned circuit 112 converts the amplified input into a digital signal and feeds this to an image detecting section 114 wherein the position of the image D is detected This data is then transmitted to a data processing section 118 by way of a data transmission section 116 wherein the image D positional data is used to determine the distance of the object from the position sensing arrangement and therefore the position of the object.

The control of the above described arrangement which is provided by the first embodiment of the present invention is depicted in the flow chart of FIG. 2. As shown, the first step (1001) of the process is such as to read the strength of the light sensor and to supply this value to the wave peak holding section wherein the peak height value P is determined (step 1002) and compared with a predetermined value Po (step 1003).

In accordance with this comparison, in the event that the level of P is in the order of Po then at step 1004 a command to reduce the laser output is issued by the wave peak holding section 106 and the steps 1001 to 1003 are repeated to incrementally reduce the intensity or power of the laser beam.

Upon the value of P falling below that of Po, the saturation problem which prevents the location of the peak, is obviated and the process goes to step 1005 wherein it is determined if the output of the laser is maximized or not. If the outcome is negative (viz., the laser is not yet being operated at full power) then the output of the laser is incrementally increased (step 1006). However, in the event of a positive outcome (if the laser is being operated at full power), the amplification gain is increased (step 1007)

As will be appreciated, steps 1001 to 1004 are such as to modify the value of P to as to be prevented from exceeding the maximum permissible value Po, and thus ensure that a wave peak value can be assuredly determined without the saturation phenomenon problem occurring.

Step 1008 of the illustrated process is such as to again read the levels of the image signal being outputted by the light sensor (step 1008) and to again establish the peak value P of the signal. At step 1010 the value of P is again compared with Po.

In the event that P is less than Po the process recycles to step 1005 in an attempt to further boost the level of same to one whereat highly accurate position determination is assured.

However, in the event that the instant value of P is equal to Po then at step 1011 the position of the peak is determined. Following this instep 1012 the position of the object is determined As will be appreciated steps 1005 to 1012 are such as to induce the situation wherein the position of the object is normally determined with the value of P maintained essentially at the maximum permissible level. This minimizes the effect of noise on the wave shape and permits accurate detection of the peak position.

FIG. 3 shows a second embodiment of the present invention. In this arrangement the input signal level is read (step 2001) and in step 2002 the width of the peak which is developed in accordance with the input, is measured at a predetermined slice or threshold level. A digital signal is then developed wherein the leading and trailing edges thereof are produced where the slice level intersects the peak. The width of the high level portion of the digital signal is determined and used in step 2003 in order to determine if the width of the peak at the threshold level is greater than a predetermined limit Wo. In the event that the width is found to be larger then at step 2004 the power of the laser is incrementally decreased and the process repeats from step 2001.

When the width W is reduced to or is less than Wo, a second comparison is carried out in step 2005 in order to determined if the value of W is less than Wo. If the outcome is positive then the process proceeds to step 2006 wherein it is determined if the output of the laser is maximized or not. If not then the power output of the laser is incrementally increased at step 2007 and the process repeats from step 2001.

However, in the event step 2006 indicates that the laser is being operated at full power the amplifier gain is incrementally increased at step 2008 in order to boost the level of W up to that of Wo.

Upon W becoming equal to Wo the process proceeds to step 2009 wherein the mid point between the leading and trailing edges of the signal generated in step 2002, is determined and this data is used in step 2010 to ascertain the position of the object.

As will be appreciated the first portion of the above described control is such as ensure the power of the laser is controlled below excessive levels while that latter stage of the process is such as to control the amplification of the width signal until such time as it is optimized.

What is claimed is:

1. In a method of detecting- the position of a movable object, the steps comprising:
   producing a laser beam;
   reflecting the laser beam off said object to produce a reflected beam;
   monitoring the reflected beam using a photo responsive sensor;
   converting the received reflected beam into a signal indicative of the image produced in said sensor, said signal having a wave form;
   detecting the magnitude of a selected parameter of said wave form;
   comparing the magnitude with the maximum permissible value;
   reducing the power of the laser beam in the event that the magnitude is greater than said maximum permissible value;
   determining, in the event that the magnitude is lower than said maximum permissible limit, if the laser beam power is maximized;
   increasing the power of the laser beam in the event that the power thereof is not maximized; and
   increasing the degree of amplification of said signal in the event that the power of the laser is maximized.

2. A method as claimed in claim 1 wherein said parameter is the height of the peak of said wave form.

3. A method as claimed in claim 1 wherein said parameter is the width of said wave form at a predetermined threshold level.

4. In a method of detecting the position of a movable object, the steps comprising:
   producing a laser beam;
   reflecting the laser beam off said object to produce a reflected beam;
   monitoring the reflected beam using a photo responsive sensor;
   converting the received reflected beam into a signal indicative of the image produced in said sensor, said signal having a wave form;
   detecting the height of the wave form peak;
   comparing the peak height with the maximum permissible value;
   reducing the power of the laser beam in the event that the height is greater than said maximum permissible value until such time as height becomes equal to the maximum permissible level;
   determining, in the event that the magnitude is lower than said maximum permissible limit, if the laser beam power is maximized;
   increasing the power of the laser beam in the event that the power thereof is not maximized;
   increasing the degree of amplification of said signal in the event that the power of the laser is maximized;
   detecting the height of the wave form for a second time;
   comparing the height with said maximum permissible value;
   repeating the steps of:
   determining if the power of the laser beam is maximized or not;
   increasing the power of the laser in the event that the laser is not being operated at full power; and
   increasing the degree of amplification of the signal in the event that the laser is being operated at full power;
   until such time as the height becomes equal to said maximum permissible level; and
   using the signal having this height to determine the position of said object.

5. In a method of detecting the position of a movable object, the steps comprising:
   producing a laser beam;
   reflecting the laser beam off said object to produce a reflected beam;
   monitoring the reflected beam using a photo responsive sensor;
   converting the received reflected beam into a signal indicative of the image produced in said sensor, said signal having a wave form;
   measuring the width of said wave form at a predetermined threshold value;
   performing a first comparison of the measured width with a maximum permissible value;
   reducing the power of the laser beam in the event that the measured width is greater than said maximum permissible value until such time as the magnitude becomes equal to said maximum permissible value;
   performing a second comparison in the event that said first comparison reveals the measured width is less than said maximum permissible valve, said second comparison again comparing the measured width with said maximum permissible value;
   determining, in the event that the measured width is less than said maximum permissible value, if the laser beam power is maximized;
   increasing the power of the laser beam in the event that the power thereof is not maximized;
   increasing the degree of amplification of said signal in the event that the power of the laser is maximized until the measured width becomes equal to the predetermined value;
   determining the mid point of the measured width; and
   using the mid point to determined the distance of said object.

* * * * *